(12) United States Patent
Ebrahimi Afrouzi et al.

(10) Patent No.: US 11,989,021 B1
(45) Date of Patent: May 21, 2024

(54) METHOD FOR OVERCOMING OBSTRUCTIONS OF A ROBOTIC DEVICE

(71) Applicants: Ali Ebrahimi Afrouzi, Henderson, NV (US); Andrew Francis Fitzgerald, Burlington (CA)

(72) Inventors: Ali Ebrahimi Afrouzi, Henderson, NV (US); Andrew Francis Fitzgerald, Burlington (CA)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 18/074,435

(22) Filed: Dec. 2, 2022

Related U.S. Application Data (63) Continuation of application No. 16/179,847, filed on Nov. 2, 2018, now abandoned.

(60) Provisional application No. 62/580,640, filed on Nov. 2, 2017.

(51) Int. Cl.
*G05D 1/00* (2006.01)
*A47L 11/00* (2006.01)

(52) U.S. Cl.
CPC ........... *G05D 1/0088* (2013.01); *A47L 11/00* (2013.01); *G05D 1/0219* (2013.01); *G05D 1/0238* (2013.01); *G05D 1/0274* (2013.01)

(58) Field of Classification Search
CPC .. G05D 1/0088; G05D 1/0219; G05D 1/0238; G05D 1/0274; G05D 2201/0208; G05D 2201/0215; A47L 11/00
See application file for complete search history.

(56) References Cited

U.S. PATENT DOCUMENTS

| | | | |
|---|---|---|---|
| 2013/0206177 A1* | 8/2013 | Burlutskiy | G05D 1/0219 15/319 |
| 2015/0266475 A1* | 9/2015 | Tanzmeister | B60W 30/0956 701/300 |
| 2017/0090456 A1* | 3/2017 | Mao | G05D 1/0246 |
| 2018/0005063 A1* | 1/2018 | Chan | G06V 20/00 |
| 2018/0050634 A1* | 2/2018 | White | B60Q 1/543 |
| 2018/0348783 A1* | 12/2018 | Pitzer | G06V 20/20 |
| 2019/0357431 A1* | 11/2019 | Kamfors | A01D 34/008 |

* cited by examiner

*Primary Examiner* — Behrang Badii (57) ABSTRACT

Provided is a method for a robotic device to autonomously overcome obstructions hindering the operational capacity of the robotic device. When a robotic device encounters an obstruction, the robotic device may enact one of a number of predetermined responses to overcome the obstruction without requiring the intervention of an outside entity to assist the robotic device with overcoming the obstruction.

20 Claims, 3 Drawing Sheets

METHOD FOR OVERCOMING OBSTRUCTIONS OF A ROBOTIC DEVICE

CROSS-REFERENCE TO RELATED APPLICATIONS

This application is a Continuation of U.S. Non-Provisional patent application Ser. No. 16/179,847, filed Nov. 2, 2018, which claims the benefit of U.S. Provisional Patent Application No. 62/580,640, filed Nov. 2, 2017, each of which is hereby incorporated by reference. In this application, certain U.S. patents, U.S. patent applications, or other materials (e.g., articles) have been incorporated by reference. Specifically, in addition to the preceding, U.S. patent application Ser. Nos. 16/048,179, 16/048,185, 15/272,752, 62/631,050 and 16/051,328 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present disclosure relates to robotic devices, and more particularly, to the methods in which a robotic device overcomes issues in the work environment interfering with the functions of the robotic device.

BACKGROUND

Autonomous or semi-autonomous robotic devices are increasingly used within consumer homes and commercial establishments. Such devices may include a robotic vacuum cleaner, lawn mower, mop, or other similar devices. One issue that remains is how that robotic devices often encounter is that the robotic devices become inoperable due to a variety of circumstances thereby requiring the physical intervention on the part of an individual to rectify the issue. For example, if a brush of a robotic cleaner becomes stuck around, for example, an electrical cord, the robotic device may become inoperable as the brush will no longer be able to spin, and an individual must come to detangle the electrical cord from the brush. In another example, brushes of robotic cleaners may become stuck due to becoming entangled with hair or the like and no longer be able to spin properly, the individual in turn must come over to detangle the hair from the brush. In other examples a robotic device may become stuck on an unexpected elevation change, encounter an unexpected dip or the like and an individual must intervene to assist the robotic device. While it is unavoidable that robotic devices will encounter issues in the work environment completely, it is preferable that a robotic device be able to overcome such issues independently. When a robotic device encounters an issue, it may render the robotic device inoperable which is undesirable as the robotic device may not be able to complete work tasks, and it is further undesirable as it often requires outside assistance for overcoming the issue. A method is needed for a robotic device to be able to overcome such issues independently.

None of the preceding discussion should be taken as a disclaimer of any of the described techniques, as the present approach may be used in combination with these other techniques in some embodiments.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention in a simplified form as a prelude to the more detailed description that is presented below.

Some aspects include a method for operating a robotic device, comprising: capturing, with a camera disposed on the robotic device, a plurality of images of an environment of the robotic device, the plurality of images comprising obstructions encountered by the robotic device during a work session; identifying, with a processor of the robotic device, an obstruction type of an obstruction captured in at least one image of the plurality of images based on a comparison between features of the obstruction and features of different possible obstruction types stored in a database, wherein: the possible obstruction types comprise at least feces and cords; the robotic device alters its navigation path to avoid the obstruction when the obstruction type is feces; an application of a communication device paired with the robotic device is configured to notify a user of a location of the obstruction and the obstruction type when the obstruction type is at least either feces or cords; and the application is further configured to receive at least one input designating a schedule of the robotic device.

Some aspects provide a robotic device configured to implement the above-described method.

Some aspects provide a medium storing instructions that when executed by a processor of a robotic device effectuate operations comprising the above-described method.

BRIEF DESCRIPTION OF DRAWINGS

The present techniques are described with reference to the following figures.

DETAILED DESCRIPTION OF SOME EMBODIMENTS

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Various embodiments are described herein below, including methods and systems. It should be kept in mind that the invention might also cover articles of manufacture that include a computer-readable medium on which computer-readable instructions for carrying out various embodiments of the inventive techniques are stored. The computer-readable medium may include semi-conductor, magnetic, opto-magnetic, optical, or other forms of computer-readable medium for storing computer-readable code. Further, embodiments may also include apparatuses for practicing embodiments of the invention. Such apparatus may include circuits, dedicated and/or programmable, to carry out tasks pertaining to embodiments described herein.

In some embodiments, "robot", "robotic device", "robotic vacuum" or "robotic cleaning device" may include one or more autonomous or semi-autonomous devices having communication, an actuator, mobility, and/or processing elements. Such robots or robotic devices may, but are not required to (which is not to suggest that any other described feature is required in all embodiments), include a casing or shell, a chassis, a transport drive system such as wheels or other mobility device, a motor to drive the wheels or other mobility device, a receiver that acquires signals transmitted from, for example, a transmitting beacon, a processor and/or controller that processes and/or controls motors, methods, and operations, network or wireless communications, power management, etc., and one or more clock or synchronizing devices. Robots or robotic devices may also include a power module for delivering (and in some cases storing) electrical power, a sensor module for observing the environment and for sending commands based on the observed environment, and a control module for storage of operation modes, command responses to the observed environment or user input, and the like. The sensor module may include sensors for detecting obstacles, types of flooring, cliffs, system status, temperature, and the like or sensors for measuring movement. An interface module may also be included to provide an interface between the robot and the user. The robot or robotic device may further include IR sensors, tactile sensors, sonar sensors, gyroscopes, ultrasonic range finder sensors, depth sensing cameras, odometer sensors, optical flow sensors, LIDAR, cameras, IR illuminator, remote controls, Wi-Fi capability, network card, Bluetooth capability, cellular functionality, USB ports and RF transmitter/receiver. Other types of robots or robotic devices with other configurations may also be used.

In embodiments, a control system of the robotic device may be utilized. The control system may include, but is not limited to, a system or device(s) that perform, for example, methods for receiving and storing data; methods for processing data; methods for processing command responses to stored or processed data, to the observed environment, to internal observation, or to user input; methods for detecting operational hazards in the work environment; methods for detecting obstacles in the work environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used.

As understood herein, the term "obstruction", "issue", "operational hazard" or "hazard" may be defined generally to include unwanted matter which may pose as an operational issue for a robotic device when operating in a work environment, including but not limited to, cords, cables, wires, toys, debris, dust, dirt, rocks, feces, substances, objects, items, and the like wherein they act as a hazard for a robotic device such as, for example, becoming entangled with a robotic device. Substances of which a robotic device has encountered and have created an issue such as clogging a mechanism, becoming entangled with or the like, such as for example hair which has become entangled with a brush rendering the brush inoperable are also obstructions. Additionally, operational hazards may include obstacles of which a robotic device may bump into and become damaged by. Further, substances on a work surface, which may, for example, damage a robotic device or render a robotic device inoperable if a robotic device navigates over the substance are also operational hazards. Items on a floor of which a robotic device cannot overcome by driving over the item, or obstacles of a type which interfere with a robotic device when conducting work operations may also be operational hazards.

As understood herein, the term "work cycle", "work session", "operational session" or "operational cycle" may be defined generally as a work time of a robotic device from start to finish, whether ended by completion of work of an area, by instruction or programmed setting, or by the depletion of a battery powering the robotic device.

Some of the embodiments introduced herein provide methods related to the use of machine learning techniques to autonomously control the actions of a robotic device when the robotic device has encountered an issue that may otherwise render the functions of the robotic device inoperable. The robotic device may comprise, but is not limited to, a set of wheels, a power source, a chassis, a suspension system, a rechargeable battery, a control module, a processor, and the like. In some embodiments, the robotic device may further comprise a mapping module for mapping the environment using mapping techniques such as SLAM, and mapping tools such as imaging devices, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, depth sensors and other devices may be used to capture information that one or more processors of the robotic device may use to localize itself within an internal map of the working environment. In some embodiments, the one or more processors of the robotic device may use machine learning techniques to learn the most optimal route for navigating through a working environment from, for example, a storage location of the robotic device to a working location of the environment and back to its storage location. In some embodiments, the processor of the robotic device may use machine learning techniques to learn the most optimal route for navigating through a working environment from, for example, a first location of the working environment, to a second location of the working environment, to a third location of the working environment, and so forth. Various observations may be collected during operation in order to determine the most optimal path for the robotic device when navigating through the work environment. For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for a working session. This may include the day, time, frequency, duration of the working session, and the like.

In embodiments, one or more processors of a robotic device may detect issues in the work environment of which the robotic device has encountered. In embodiments, the one or more processors of the robotic device may detect issues such as obstructions and operational hazards via sensory input by the one or more sensors of a robotic device. For example, the one or more processors may detect that the robotic device has encountered an issue due to a mechanism of the robotic device becoming inoperable. For example, if a brush of a robotic device ceases to operate in a normal capacity such as spinning, the one or more processors of the robotic device may determine that the robotic device has encountered an obstruction. In embodiments, the electrical current of a brush may determine whether or not the brush has become obstructed. If the electrical current utilized is not generating enough power for the brush to spin for a normal operation, the one or more processors of the robotic device may determine that the brush has become obstructed. An increase in electrical current may be provided to the brush in order to attempt to overcome the obstruction. If unsuccessful, the one or more processors of the robotic device may determine that the brush has become obstructed. In another example, sensors angled at mechanisms of the robotic device such as cameras or the like angled so as to view a perspective of various mechanisms of a robotic device such as, for example, a brush, a wheel, or the like, may capture features of an obstruction of which one or more processors of a robotic device may determine that the mechanism has become obstructed. For example, a camera angled at a main brush of a robotic device may capture images that hair or other unwanted matter has becoming entangled around the brush rendering it inoperable. As another example, an odometer may be utilized and the odometer readings may indicate to one or more processors of a robotic device that an obstruction has been encountered by the robotic device. For example, if an odometer is reading at a lower than a predetermined threshold for wheels or brushes of a robotic device, the one or more processors of the robotic device may determine that an obstruction has been encountered by the robotic device. As another example, if a robotic device ceases to navigate due to one or more wheels of a robotic device rotating properly, or if a suctioning module ceases to suction, or the like, the one or more processors of the robotic device may determine that the robotic device has encountered an obstruction.

In some embodiments, one or more processors of a robotic device may predict that a robotic device is likely to encounter an obstruction. For example, one or more sensors of a robotic device may capture features of an operational hazard in the work environment. In some embodiments, a memory of the robotic device may contain an internal database of operational hazards likely to be encountered within the working environment. In embodiments, an operational hazard encountered in the work environment may be identified using various sensors to capture features of the operational hazard and the processor of the robotic device may compare the features captured of the operational hazard with features stored in an internal database of types of operational hazards that may be encountered in order to determine the type of operational hazard the robotic device has encountered. In embodiments, when the one or more processors of a robotic device identify an operational hazard in the work environment, the one or more processors may command the robotic device to continue operations as normal. In embodiments, when the one or more processors of a robotic device identify an operational hazard in the work environment, the one or more processors may command the robotic device to avoid the operational hazard. In some embodiments, when the one or more processors of a robotic device identify an operational hazard in the work environment, the one or more processors may command the robotic device to attempt to overcome the operational hazard, obstacle, or the like. For example, if a cord or cable has been identified on the work surface, the one or more processors may command the robotic device to attempt to navigate over the cord or cable. In embodiments, if the robotic device is successful in navigating over an operational hazard, the one or more processors of the robotic device may catalogue the encounter and attempt to do so again in future similar encounters. In embodiments, if a mechanism of the robotic device becomes inoperable immediately after attempting to overcome an operational hazard, the one or more processors may determine that there is a high likelihood that the robotic device has become inoperable due to the operational hazard. In embodiments, if a robotic device attempts to overcome an operational hazard and is unsuccessful the one or more processors may catalogue the encounter for future use and avoid such operational hazards in the future. In some embodiments, a set of preprogrammed responses may be set for differing types of operational hazards. For example, the response of a robotic device becoming entangled with a cord or cable may be different than the response a robotic device has for an elevation change, for a brush becoming obstructed, or the like.

Figure 1A:
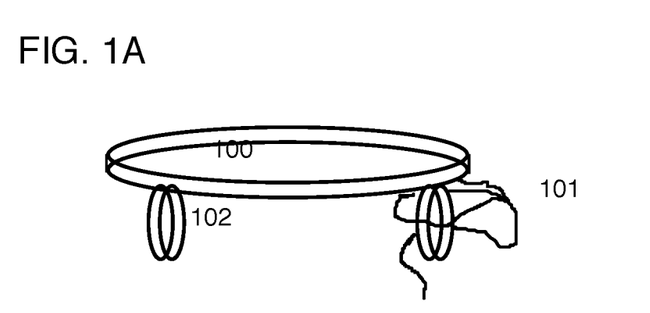
FIG. 1A-C illustrate a series of steps in which a robotic device may overcome an obstruction.
Figure 1B:
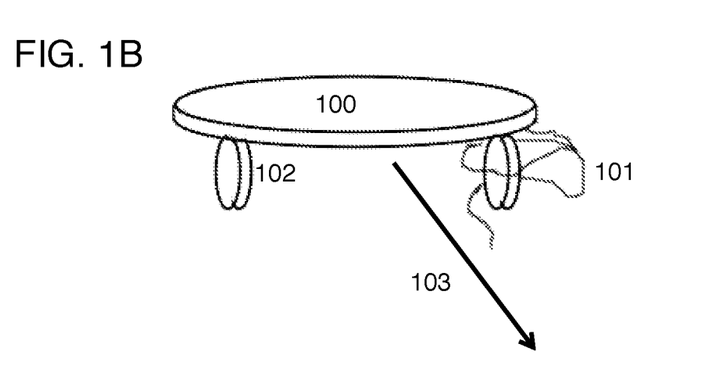
Figure 1C:
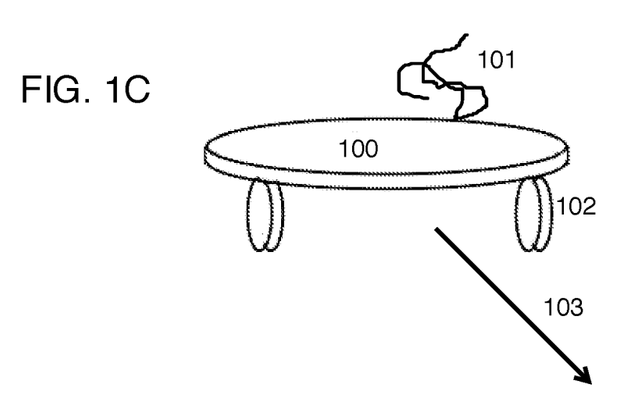
Figure 2A:
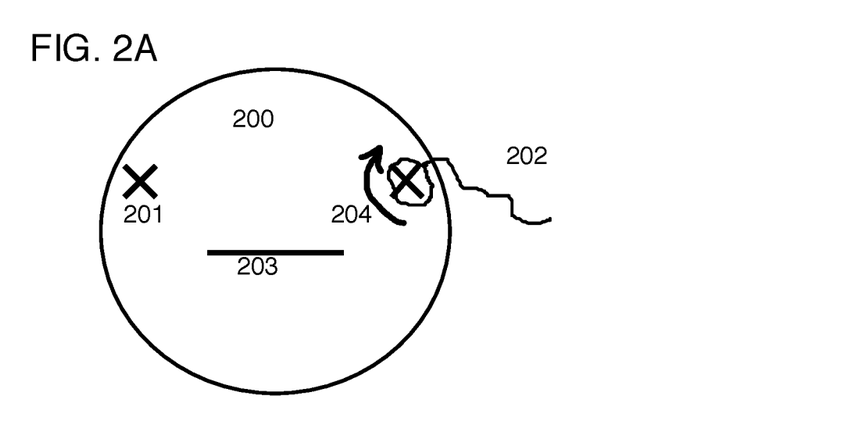
FIG. 2A-C illustrate a series of steps in which a robotic device may overcome an obstruction.
Figure 2B:
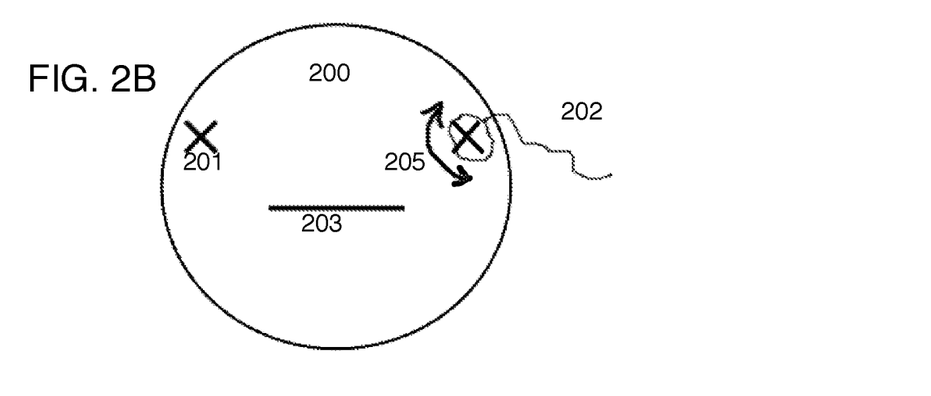
Figure 2C:
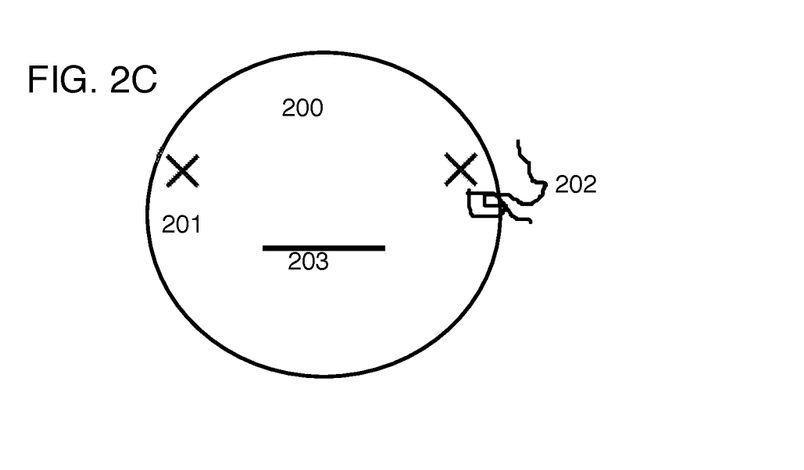

FIGS. 1A-C depict an example of a response that a robotic device may make in response to a wheel of the robotic device becoming entangled with an obstruction. In FIG. 1A wheel 102 of robotic device 100 has become entangled with obstruction of the work environment 101. In FIG. 1B, robotic device 100 begins to navigate in direction 103 in order to attempt to remove obstruction 101 from wheel 102 of robotic device 100. In FIG. 1B, robotic device 100 may navigate in a forward direction, providing more power to navigate in the already forward navigation direction, may reverse, or utilizing an omnidirectional wheel mechanism may navigate in other directions. In FIG. 1C, robotic device 100 has successfully removed entanglement with obstruction 101 from wheel 102 of robotic device 100 by navigating in direction 103. FIGS. 2A-C depict an example of a response that a robotic device may make in response to a brush of the robotic device becoming entangled with an obstruction. In another example, FIG. 2A displays robotic device 200 is displayed with side brushes 201 and main brush 203. Right side brush 201 of robotic device 200 has become entangled with obstruction 202 of work environment while side brush 201 spins in clockwise direction 204. In FIG. 2B robotic device 200 attempts to overcome obstruction 202 from side brush 201 by reversing rotation of side brush 201 in counter clockwise direction 205. In FIG. 2C robotic device 200 has successfully removed obstruction 202 from side brush 201 of robotic device 200.

In embodiments, when a robotic device has encountered an issue jeopardizing the operational capacity of the robotic device, the robotic device may attempt to overcome the issue. For example, in embodiments, a robotic device may encounter a cable, cord or the like of the work environment and the cord or cable may become entangled with the robotic device. For example, a cord or cable may become entangled with a wheel mechanism of the robotic device. In embodiments, if, for example, an obstruction becomes entangled with, for example, a wheel of a robotic device, the one or more processors of the robotic device may receive sensory input indicating that an issue has arisen such as, for example, that the robotic device is unable to navigate forward due to a particular wheel not spinning properly. In such a situation, a robotic device may attempt to reverse the wheels, propelling itself in a reverse direction to overcome the issue. Other possibilities are available for overcoming such an obstruction. For example, a robotic device may be equipped with mecanum wheels, providing the robotic device with omnidirectional capacity, and the robotic device may attempt a number of traveling directions for its wheels for overcoming the obstruction. Alternatively, additional power may be provided to the wheel mechanism of the robotic device in order to attempt to drive forward with additional power. For example, a motor of a robotic device may provide additional power to the wheels of the robotic device such that the wheels are able to overcome the obstruction by navigating in the same direction that the robotic device was navigating in when the wheel became obstructed. Further, additional power may be provide to, for example, a wheel mechanism and the wheel mechanism navigates the robotic device in a direction other than that of which the robotic device was navigating in when the robotic device became obstructed. As another example, a brush of a robotic device may become entangled with a cord or cable of the work environment and the response of the robotic device may be any of, reversing the direction of rotation of the entangled brush, navigating the robotic device in a variety of directions, or the like. For example, if a side brush of a robotic device has become entangled with a cord or cable of the work environment, the brush may reverse its spin in an opposite direction, the robotic device may navigate in a reverse direction, or the like. Further, additional power may be provided to the obstructed mechanism such as brush, such as, for example, from a motor, such that the obstructed mechanism such as a brush is able to rotate at a higher rate of speed in order to attempt to dislodge the obstruction.

In some embodiments, a robotic device may encounter an issue due to an unexpected elevation change. For example, a robotic device may navigate on a hard floor surface and transition to a thick pile carpet, the angle of the robotic device and the differing floor surface types causing a potential issue for the robotic device. For example, one set of wheels may be positioned on the thick pile carpet while a second set of wheels are positioned on the hard floor surface, the propelling wheels of the robotic device being located on the thick pile carpet which have become stuck in a forward motion. A response of a robotic device may be to attempt to navigate in a different direction, such as a reverse direction to overcome the issue, or a motor of the propelling wheels may provide extra power to the propelling wheels such that the wheels are able to navigate in a direction such that the robotic device stable again. For example, a motor may provide additional power to the propelling wheels of the robotic device such that the robotic device is able to navigate forward to be fully on the thick pile carpet. Conversely, additional power may be provided such that the wheels reverse, or navigate in a different direction, such that the robotic device becomes stable again. A robotic device may include an omnidirectional wheel mechanism such that the robotic device may maneuver in a variety of directions as such in order to overcome issues of the work environment.

Figure 3A:
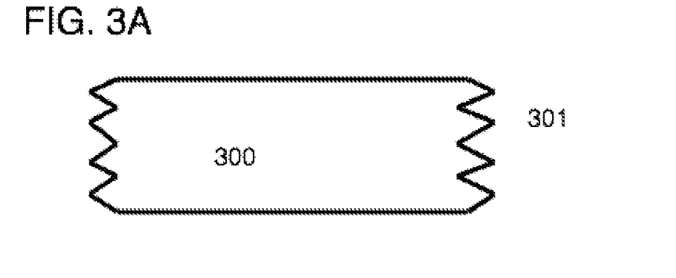
FIG. 3A-E illustrate a series of steps in which a robotic device may overcome an obstruction.
Figure 3B:
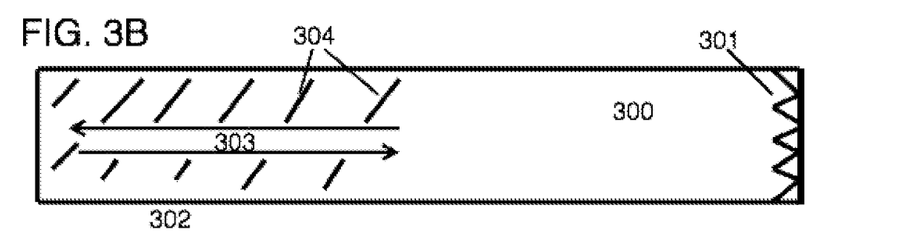
Figure 3C:
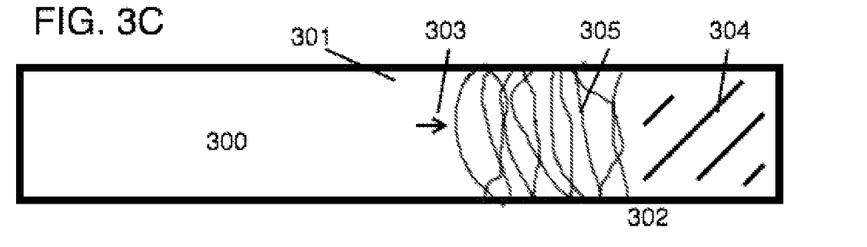
Figure 3D:
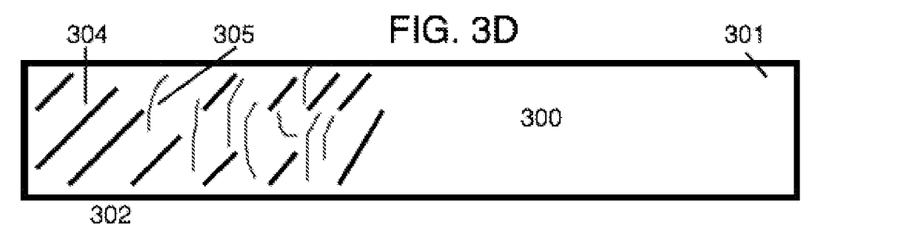
Figure 3E:
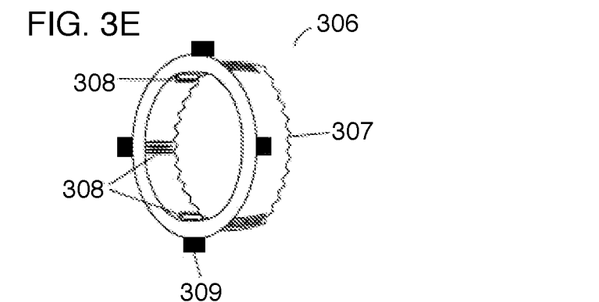

In some embodiments, a robotic device may encounter an issue such as an obstruction impeding a mechanism of the robotic device. In embodiments, for example, a brush of a robotic device may become entangled with an obstruction such as a main brush becoming entangled with an obstruction from the work environment. In embodiments, the robotic device may attempt to reverse the direction in which the main brush spins in order to remove the obstruction from the brush. In some embodiments, the rpm rate of the brush may be increased in order to remove an obstruction such as, for example, by providing additional power to the brush. In some embodiments, if a brush is utilized together with a vacuuming module, if a brush encounters an obstruction, the vacuum suction may be increased in order to attempt to suction in the obstruction. In some embodiments, if a brush is utilized together with a vacuuming module and the brush encounters an obstruction, the vacuuming module may reverse airflow and instead blow air in an opposite direction in order to attempt to dislodge the obstruction. In some embodiments, a module may be utilized for removing obstructions from brushes of a robotic device. In some embodiments, a module for removing obstructions from brushes of a robotic device may comprise a combing module with serrated edges. In some embodiments, a combing module with serrated edges may be combined with a module for providing power and movement such as a motor such that the serrated combing module navigates along the length of the brush, such that any obstructions are removed from the brush by the combing module. In embodiments, for example, an obstruction along a brush such as for example, hair, may be cut through by a combing module with serrated edges such that the hair is no longer entangled with the brush. In embodiments, once an obstruction has been cut or loosened by a combing module, a vacuuming module or a blowing module may suction or blow the obstruction from the brush. For example, if an obstruction such as tangled hair has been cut loose from a main brush of a robotic vacuum, a vacuum suction module may suction the cut hair particulates into the dustbin storage container of the robotic device and the main brush of the robotic device may begin to spin again. FIG. 3A depicts an example of a combing module 300 with serrated edges 301 utilized for removing tangled materials from a brush (not shown) of a robotic device. In FIG. 3B, combing module 300 with serrated edges 301 is positioned on main brush 302 of robotic device. Combing module 300 slides 303 along main brush 302 in order to remove any unwanted matter from bristles 304 of main brush 302. In FIG. 3C combing module 300 with serrated edges 301 is positioned on main brush 302 of robotic device. Combing module 300 will slide 303 along main brush 302 in order to remove unwanted matter 305 tangled in bristles 304 of main brush 302 in order to cut the unwanted matter 305 with serrated edge 301 of combing module 300. In FIG. 3D combing module 300 has successfully loosened unwanted matter 305 from bristles 304 of main brush 302 utilizing serrated edge 301 of combing module 300. In some embodiments, the comb with serrated edges may spin as it navigates along the brush in order to assist with cutting or dislodging any unwanted matter stuck on the brush. In some embodiments, the comb may comprise inward facing blades or teeth as well as a serrated outward facing blade in order to assist with cutting and dislodging of unwanted matter. In FIG. 3E an example of a cross section of a comb 306 is illustrated. The comb comprising a hollow body 309 with inward facing blades 308 and outward facing serrated edge 307 to facilitate the removal of unwanted matter.

In some embodiments a robotic device may comprise a module for suctioning and/or blowing air. In embodiments, when an obstruction occurs of which a suctioning or blowing module becomes obstructed, the one or more processors of the robotic device may command the module to reverse the air flow that is being utilized in order to remove the obstruction. For example, if a module is suctioning air and the module becomes obstructed, the one or more processors of the robotic device may command that the module reverse the airflow in order to remove the obstruction such as by blowing air. In embodiments, the suctioning or blowing of air may comprise a fan impeller mechanism and the fan impeller is reversible to provide both suctioning and blowing power. In some embodiments, when a brush of a robotic device has had an obstruction removed such as by, for example, a combing module, the suctioning module may suction in the removed obstruction. In some embodiments, when a brush of a robotic device has had an obstruction removed such as by, for example, a combing module, the blowing module may blow away the removed obstruction.

In embodiments, when an operational hazard has been detected in the work environment the one or more processors of the robotic device may note an increased likelihood of that type of operation hazard being located in the region of the environment in which it was encountered. For example, if a robotic device encounters a cable on the work surface, image sensors of the robotic device may capture features of the cable and the processor may determine it is a cable based on an internal database of operational hazards and their features. The processor of the robotic device may mark the region in which the cable was encountered within an internal map of the robotic device as a region with increased likelihood of containing a cable. In some embodiments, the processor may further determine if the type of operational hazard encountered may be overcome by the robotic device. For example, the processor may determine if the operational hazard encountered is, for example, a liquid, but the robotic device is, for example, a vacuum, that the operational hazard poses a danger to the robotic device and that the robotic device should therefore avoid the liquid. In embodiments, if the robotic device encounters and identifies a type of operational hazard, a robotic device may alert a user or a robotic device which has the capabilities of dealing with the hazard. In embodiments, regions wherein the same operational hazard are consistently encountered may be classified by a processor of the robotic device as a high operational hazard area and may be marked in a map of the environment as such. In embodiments, the processor of the robotic device may attempt to alter its path in order to avoid high operational hazard areas. In embodiments, regions wherein operational hazards are consistently encountered may be classified by a processor of the robotic device as a high operational hazard area and may be marked in a map of the environment as such. In embodiments, the processor of the robotic device may attempt to alter its path in order to avoid high operational hazard areas. Dynamic obstacles include obstacles of which a robotic device does not expect to encounter, such as, for example, moving objects including, but not limited to, pets, humans, other robotic devices, and the like. Dynamic obstacles may also be new obstacles that are now present in a location in which an obstacle was not previously present. In embodiments, if a robotic device encounters a dynamic obstacle in repeated circumstances in a same location, the dynamic obstacle may be considered and reclassified to be a permanent obstacle. In some embodiments, transitions between different work surface types may pose an operational hazard, for example, a transition from a hardwood surface to a thick pile carpet may pose an operational hazard as it may cause a robotic device to become unstable as it attempts to overcome the transition. In some embodiments, preferences may be set, and the set of preferences may determine what poses as an operational hazard. For example, a preference may be set that a robotic device only operate on a hard floor surface; if a robotic device encounters a carpeted surface during operation, based on the preferences set the transition to carpet may be identified as an operational hazard.

In some embodiments, a mobile robotic device's navigation and operations plan may factor in data pertaining to the number of hazards expected to be encountered in areas of the work environment. In embodiments, during a working session, a robotic device may encounter areas in the work environment which contain operational hazards. In embodiments, when a robotic device encounters an operational hazard in the work environment, data pertaining to the operational hazard will be compiled and kept note of for future use. In embodiments, for example, data pertaining to the location, date and time that the operational hazard was encountered may be compiled for future use. In embodiments, for example, data pertaining to the type of operational hazard encountered, such as, for example, cables on a work surface and the like may be compiled by, for example, a robotic device such as, for example, a robotic vacuum. For example, if a robotic vacuum encounters a cable, and the cable becomes entangled around a brush of the robotic vacuum rendering the robotic vacuum inoperable, this data will be compiled for future use. In another example, if a robotic device encounters an operational hazard such as, for example, a liquid on a work surface of which a robotic device can not clean away, or which poses a danger to a robotic device, data pertaining to this encounter may be compiled. In additional embodiments, if a robotic device encounters an obstacle such as, for example, a robotic device bumping into an obstacle, data pertaining to this encounter may be compiled.

In embodiments, the robotic device may compile and catalogue all the data regarding operational hazards that have been detected in the work environment. In embodiments, regions where operational hazards have been detected by the robotic device, or have been detected by another robotic device, or in regions which have been classified as a high operational hazard area, a robotic device may give a lower priority to when planning a working session and navigational route. In embodiments, in order to provide the most efficient operational session possible, a robotic device may prioritize working in areas with a low likelihood of containing operational hazards over areas with a high likelihood of containing operational hazards in order to work in the most efficient manner possible by focusing on the areas least likely to contain an operational hazard. In embodiments, for example, if in a bedroom area, cables are routinely strewn about a room and encountered by a robotic device, while in a sitting room there is routinely a low level of operational hazards, a robotic device when planning a working session and navigational route may prioritize operating in the sitting room area first before operating in the bedroom. Further, in embodiments, a scheduling module may be utilized for setting schedules for the operations of a robotic device. For example, a schedule may be set for a robotic device to clean an entire house over the course of a week with the robotic device operating daily, but only supplying the robotic device with the ability to operate for, for example, two hours each day. In such an example, a robotic device may prioritize cleaning functions for areas with a low likelihood of containing operational hazards before cleaning areas which have a higher likelihood of containing operational hazards. In embodiments, the robotic device may keep track of which area it has operated in during each work session. In embodiments a robotic device may keep track of locations within each work area in order to plan a work session and navigational route. In embodiments, for example, a robotic device may prioritize areas in a room that have a lower likelihood of containing operational hazards than areas in the same room that have a higher likelihood of containing an operational hazard, and thereby perform functions and a navigational route as such. In some embodiments, a robotic device may alter the functions of the robotic device based on the presence or absence of operational hazards, or likelihood of an operational hazard being present in a work area. In embodiments, for example, a robotic device may operate at a faster rate of traveling speed in areas where operational hazards are not present or where there is a low likelihood of operational hazards being present. In embodiments, for example, a robotic device may operate at a slower rate of traveling speed in areas where operational hazards are present.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a child's toy on the ground, image sensors of the robotic device may capture features of the child's toy and the processor may determine it is a child's toy based on an internal database of obstacles and their features. The processor of the robotic device may mark the region in which the child's toy was encountered within an internal map as a region with increased likelihood of containing a child's toy. In some embodiments, the processor may further determine if an obstacle may be overcome by the robotic device. For example, the processor may determine if the obstacle is of a type that may be overcome by the robotic device driving over the obstacle by attempting to do so. In embodiments, for example, if a robotic device encounters an obstacle on the work surface, and that obstacle is a cord, the robotic device may attempt to determine whether or not it can overcome such an obstacle by attempting to drive over it. In embodiments, for example, if the robotic device fails to overcome the obstacle such as, for example, a cord, then the robotic device may determine that it should avoid cords. In embodiments, for example, if the robotic device is successful in overcoming the obstacle, such as, for example, a cord, then the robotic device may determine that it may attempt to overcome similar obstacles in the future. In embodiments, if the robotic device encounters an obstacle with which interferes with the robotic device's functionality, or which disables the robotic device, such as, for example, if a cord in the environment becomes entangled with a brush of the robotic device, the robotic device may catalogue the encounter and avoid such obstacles in the future. In embodiments, if a robotic device encounters a large obstacle, such as, for example, a table or chair, the processor may determine that it cannot overcome the obstacle and may attempt to maneuver around the obstacle. In some embodiments, regions wherein obstacles are consistently encountered may be classified by the processor of the robotic device as a high traffic area. In embodiments, an area of a work environment classified as an area with a high likelihood of containing an obstacle and may be marked as such in an internal a map of the robotic device of the environment. In some embodiments, the processor of the robotic device may attempt to alter its path in order to avoid high obstacle areas. In some embodiments, the date, time, location, and type of obstacle encountered may be catalogued for use in future working sessions. In embodiments, for example, where obstacles are encountered frequently at a similar time, a robotic device may plan a working session for such an area when obstacles are encountered less frequently, and may prioritize operations in other locations at the time when that area tends to have a high frequency of obstacles.

In embodiments, utilizing a mapping module, a robotic device may generate a map of the working environment as the robotic device navigates through the work environment. In embodiments, with each working session, the robotic device may generate a map of the work environment. In embodiments, with each successive working session, the map generated during that session may be compiled with maps generated from prior work cycles. In embodiments, the compiled maps may generate a comprehensive map of all the maps previously generated. In embodiments, the comprehensive map may contain data suggestive of trends in the work environment. In embodiments, for example, trends regarding operational hazards such as the type of hazard encountered, location of hazard encountered, how often a hazard or hazards are encountered, the date and or time a hazard was encountered and the like data may be utilized for the planning of a work session or navigational route. In embodiments, the map of the work area may utilize a grid system, in which the work area is divided into a grid of cells. In embodiments, as the robotic device navigates through the work area, or operates during a working session, data captured through sensors of the robotic device may be recorded in each portion of the map. In embodiments, the data captured through the sensors may be recorded for each cell in a grid of the map. In embodiments, data obtained by a control system or another robotic device may be recorded for each portion of the map. In embodiments, data obtained by a control system or another robotic device may be recorded for each portion of the map. In some embodiments, the data may simply reflect a presence or absence of operational hazards for that portion or cell in the map. In some embodiments data pertaining to the type of operational hazard, number of operational hazards, size of operational hazards, and the like, may be represented in each cell in the map. In embodiments, with each working session, a robotic device may record a value for each portion of the map pertaining to data representative of operational hazards. In embodiments, a map containing all of the values for each portion of a map operated in may be generated by the robotic device. In embodiments, during each working session the robotic device will generate a new map with a new set of values for each portion of the map. In embodiments, after each working session the map generated is compiled into an aggregate compiled map which is condensed from all prior maps generated during prior working sessions. In embodiments, the aggregate map generated represents each portion of the map as an average of the values for that portion from all compiled past working cycles. In embodiments, the aggregate map generated is updated after each new cycle. In embodiments, the portions of the map may represent values with regards to multiple types of data. In embodiments, for example, each portion of the map may contain data representative of various information pertaining to, for example, operational hazards, debris, obstacles, work surface types, and the like.

An example of a method for mapping a floor plan is described in U.S. patent application Ser. Nos. 16/048,179 and 16/048,185, the entirety of which are hereby incorporated by reference. Some embodiments afford a method and apparatus for combining perceived depths from cameras or any other depth perceiving device(s), such as a depth sensor comprising, for example, an image sensor and IR illuminator, to construct a floor plan. Cameras may include depth cameras, such as but not limited to, stereo depth cameras or structured light depth cameras or a combination thereof. A CCD or CMOS camera positioned at an angle with respect to a horizontal plane combined with an IR illuminator, such as an IR point or line generator, projecting IR dots or lines or any other structured form of light (e.g., an IR gradient, a point matrix, a grid, etc.) onto objects within the environment sought to be mapped and positioned parallel to the horizontal plane may also be used to measure depths. Other configurations are contemplated. For example, the camera may be positioned parallel to a horizontal plane (upon which the robot translates) and the IR illuminator may be positioned at an angle with respect to the horizontal plane or both the camera and IR illuminator are positioned at angle with respect to the horizontal plane. Various configurations may be implemented to achieve the best performance when using a camera and IR illuminator for measuring depths. Examples of cameras which may be used are the OmniPixel3-HS camera series from OmniVision Technologies Inc. or the UCAM-II JPEG camera series by 4D Systems Pty Ltd. Any other depth perceiving device may also be used including but not limited to ultrasound and sonar depth perceiving devices. Off-the-shelf depth measurement devices, such as depth cameras, may be used as well. Different types of lasers may be used, including but not limited to edge emitting lasers and surface emitting lasers. In edge emitting lasers the light emitted is parallel to the wafer surface and propagates from a cleaved edge. With surface emitting lasers, light is emitted perpendicular to the wafer surface. This is advantageous as a large number of surface emitting lasers can be processed on a single wafer and an IR illuminator with a high density structured light pattern in the form of, for example, dots can improve the accuracy of the perceived depth. Several co-pending applications by the same inventors that describe methods for measuring depth may be referred to for illustrative purposes. For example, one method for measuring depth comprises a laser light emitter, two image sensors and an image processor whereby the image sensors are positioned such that their fields of view overlap. The displacement of the laser light projected from the image captured by the first image sensor to the image captured by the second image sensor is extracted by the image processor and used to estimate the depth to the object onto which the laser light is projected. In another method two laser emitters, an image sensor and an image processor are used to measure depth. The laser emitters project light points onto an object which is captured by the image sensor. The image processor extracts the distance between the projected light points and compares the distance to a pre-configured table (or inputs the values into a formula with outputs approximating such a table) that relates distances between light points with depth to the object onto which the light points are projected. Some embodiments apply the depth measurement method to any number of light emitters, where for more than two emitters the projected light points are connected by lines and the area within the connected points is used to determine depth to the object. In a further example, a line laser positioned at a downward angle relative to a horizontal plane and coupled with an image sensor and processer are used to measure depth. The line laser projects a laser line onto objects and the image sensor captures images of the objects onto which the laser line is projected. The image processor determines distance to objects based on the position of the laser line as projected lines appear lower as the distance to the surface on which the laser line is projected increases.

In some embodiments, the information sensed by the sensor may be processed and translated into depth measurements, which, in some embodiments, may be reported in a standardized measurement unit, such as millimeter or inches, for visualization purposes, or may be reported in non-standard units. Depth may be inferred (or otherwise perceived) in various ways. For example, depths may be inferred based (e.g., exclusively based on or in combination with other inputs) on pixel intensities from a depth image captured by a depth camera. Depths may be inferred from the time it takes for an infrared light (or sound) transmitted by a sensor to reflect off of an object and return back to the depth perceiving device or by a variety of other techniques. For example, using a time-of-flight camera, depth may be estimated based on the time required for light transmitted from a robot to reflect off of an object and return to a camera on the robot, or using an ultrasonic sensor, depth may be estimated based on the time required for a sound pulse transmitted from a robot-mounted ultrasonic transducer to reflect off of an object and return to the sensor. In some embodiments, a one or more infra-red (IR) (or with other portions of the spectrum) illuminators (such as those mounted on a robot) may project light onto objects (e.g., with a spatial structured pattern (like with structured light), or by scanning a point-source of light), and the resulting projection may be sensed with one or more cameras (such as robot-mounted cameras offset from the projector in a horizontal direction). In resulting images from the one or more cameras, the position of pixels with high intensity may be used to infer depth (e.g., based on parallax, based on distortion of a projected pattern, or both in captured images). In some embodiments, raw data (e.g., sensed information from which depth has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units.

In embodiments, raw data may be provided in matrix form or in an ordered list (which is not to suggest that matrices cannot be encoded as ordered lists in program state). When the raw data of the sensor are directly used by an AI algorithm, these extra steps may be bypassed and raw data may be directly used by the algorithm, where raw values and relations between the raw values are used to perceive the environment and construct the map directly without converting raw values to depth measurements with metric or imperial units prior to inference of the map (which may include inferring or otherwise perceiving a subset of a map, like inferring a shape of a piece of furniture in a room that is otherwise mapped with other techniques). For example, in embodiments, where at least one camera coupled with at least one IR laser is used in perceiving the environment, depth may be inferred based on the position and/or geometry of the projected IR light in the image captured. For instance, some embodiments may infer map geometry (or features thereof) with a trained convolutional neural network configured to infer such geometries from raw data from a plurality of sensor poses. Some embodiments may apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments may include three, five, ten, or more such stages trained on progressively finer-grained residual differences relative to outputs of earlier stages in the model pipeline. In some cases, object may be detected and mapped with, for instance, a capsule network having pose invariant representations of three dimensional objects. In some cases, complexity of exploiting translational invariance may reduced by leveraging constraints where the robot is confined to two dimensions of movement, and the output map is a two dimensional map, for instance, the capsules may only account for pose invariance within a plane. A digital image from the camera may be used to detect the position and/or geometry of IR light in the image by identifying pixels with high brightness (or outputs of transformations with high brightness, like outputs of edge detection algorithms). This may be used directly in perceiving the surroundings and constructing a map of the environment. The raw pixel intensity values may be used to determine the area of overlap between data captured within overlapping fields of view in order to combine data and construct a map of the environment. In the case of two overlapping images, the area in which the two images overlap contain similar arrangement of pixel intensities in at least a portion of the digital image. This similar arrangement of pixels may be detected and the two overlapping images may be stitched at overlapping points to create a segment of the map of the environment without processing the raw data into depth measurements.

As a further example, raw time-of-flight data measured for multiple points within overlapping fields of view may be compared and used to find overlapping points between captured data without translating the raw times into depth measurements, and in some cases, without first triangulating multiple depth measurements from different poses to the same object to map geometry of the object. The area of overlap may be identified by recognizing matching patterns among the raw data from the first and second fields of view, such as a pattern of increasing and decreasing values. Matching patterns may be detected by using similar methods as those discussed herein for detecting matching patterns in depth values perceived from two overlapping fields of views. This technique, combined with the movement readings from the gyroscope or odometer and/or the convolved function of the two sets of raw data can be used to infer a more accurate area of overlap in some embodiments. Overlapping raw data may then be combined in a similar manner as that described above for combing overlapping depth measurements. Accordingly, some embodiments do not require that raw data collected by the sensor be translated into depth measurements or other processed data (which is not to imply that "raw data" may not undergo at least some processing between when values are sensed by a sensor and when the raw data is subject to the above techniques, for instance, charges on charge-coupled image sensors may be serialized, normalized, filtered, and otherwise transformed without taking the result out of the ambit of "raw data").

In some embodiments, depths may be determined by measuring a vector with the robot (or camera) at the origin and extending to an object and calculating the Euclidean norm of the vector. Structure of data used in inferring depths may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths may be perceived (e.g., measured or otherwise inferred) in any form and be reported in any format.

In one embodiment, a camera, installed on a robotic device, for example, perceives depths from the camera to objects within a first field of view. Depending on the type of depth perceiving device used, depth data may be perceived in various forms. In one embodiment the depth perceiving device may measure a vector to the perceived object and calculate the Euclidean norm of each vector, representing the depth from the camera to objects within the first field of view. The LP norm is used to calculate the Euclidean norm from the vectors, mapping them to a positive scalar that represents the depth from the camera to the observed object. In some embodiments, this data structure maps the depth vector to a feature descriptor to improve frame stitching, as described, for example, in U.S. patent application Ser. No. 15/954,410, the contents of which are hereby incorporated by reference. In some embodiments, the depth perceiving device may infer depth of an object based on the time required for a light to reflect off of the object and return. In a further example, depth to objects may be inferred using the quality of pixels, such as brightness, intensity, and color, in captured images of the objects, and in some cases, parallax and scaling differences between images captured at different camera poses. It is noted that each step taken in the process of transforming a matrix of pixels, for example, each having a tensor of color, intensity and brightness, into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure. The angular resolution of perceived depths is varied in different implementations but generally depends on the camera resolution, the illuminating light, and the processing power for processing the output. For example, if the illuminating light generates distinctive dots very close to one another, the resolution of the device is improved. The algorithm used in generating the vector measurement from the illuminated pixels in the camera also has an impact on the overall angular resolution of the measurements. In some embodiments, depths are perceived in one-degree increments. In other embodiments, other incremental degrees may be used depending on the application and how much resolution is needed for the specific task or depending on the robotic device and the environment it is running in. For robotic devices used within consumer homes, for example, a low-cost, low-resolution camera can generate enough measurement resolution. For different applications, cameras with different resolutions can be used. In some depth cameras, for example, a depth measurement from the camera to an obstacle in the surroundings is provided for each angular resolution in the field of view.

In some embodiments, the robotic device together with the mounted camera rotates to observe a second field of view partly overlapping the first field of view. The camera is used to perceive depths from the camera to objects within the second field of view. In some embodiments, the amount of rotation between two consecutively observed fields of view varies. In some cases, the amount of overlap between the two consecutive fields of view depends on the angular displacement of the robotic device as it moves from taking measurements within one field of view to taking measurements within the next field of view, or a robot may have two or more cameras at different positions (and thus poses) on the robot to capture two fields of view, or a single camera may be moved on a static robot to capture two fields of view from different poses. In some embodiments, the mounted camera rotates (or otherwise scans, e.g., horizontally and vertically) independently of the robotic device. In such cases, the rotation of the mounted camera in relation to the robotic device is measured. In another embodiment, the values of depths perceived within the first field of view are adjusted based on the predetermined or measured angular (and in some cases, linear) movement of the depth perceiving device.

In some embodiments, the depths from the first field of view are compared with the depths from the second field of view. An area of overlap between the two fields of view is identified (e.g., determined) when (e.g., during evaluation a plurality of candidate overlaps) a number of consecutive (e.g., adjacent in pixel space) depths from the first and second fields of view are equal or close in value. Although the value of overlapping perceived depths from the first and second fields of view may not be exactly the same, depths with similar values, to within a tolerance range of one another, can be identified (e.g., determined to correspond based on similarity of the values). Furthermore, identifying matching patterns in the value of depths perceived within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities.

In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric can be used to indicate how good of an overlap there is between the two sets of perceived depths.

Or some embodiments may determine an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

In some embodiments, images may be preprocessed before determining overlap. For instance, some embodiments may infer an amount of displacement of the robot between images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. Further, some embodiments may downres images to afford faster matching, e.g., by selecting every other, every fifth, or more or fewer vectors, or by averaging adjacent vectors to form two lower-resolution versions of the images to be aligned. The resulting alignment may then be applied to align the two higher resolution images.

In some embodiments, the area of overlap is expanded to include a number of depths perceived immediately before and after (or spatially adjacent) the perceived depths within the identified overlapping area. Once an area of overlap is identified (e.g., as a bounding box of pixel positions or threshold angle of a vertical plane at which overlap starts in each field of view), a larger field of view is constructed by combining the two fields of view using the perceived depths within the area of overlap as the attachment points. Combining may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining. The method of using the camera to perceive depths within consecutively overlapping fields of view and the control system to identify the area of overlap and combine perceived depths at identified areas of overlap is repeated, e.g., until all areas of the environment are discovered and a floor plan is constructed.

The resulting floor plan may be encoded in various forms. For instance, some embodiments may construct a point cloud of two dimensional or three dimensional points by transforming each of the vectors into a vector space with a shared origin, e.g., based on the above-described displacement vectors, in some cases with displacement vectors refined based on measured depths. Or some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when mapping. Vectors need not be labeled as "vectors" in program code to constitute vectors, which is not to suggest that other mathematical constructs are so limited. In some embodiments, vectors may be encoded as tuples of scalars, as entries in a relational database, as attributes of an object, etc. Similarly, it should be emphasized that images need not be displayed or explicitly labeled as such to constitute images. Moreover, sensors may undergo some movement while capturing a given image, and the "pose" of a sensor corresponding to a depth image may, in some cases, be a range of poses over which the depth image is captured.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

The robotic device may, for example, use the floor plan map to autonomously navigate the environment during operation, e.g., accessing the floor plan to determine that a candidate route is blocked by an obstacle denoted in the floor plan, to select a route with a route-finding algorithm from a current point to a target point, or the like. In some embodiments, the floor plan is stored in memory for future use. Storage of the floor plan may be in temporary memory such that a stored floor plan is only available during an operational session or in more permanent forms of memory such that the floor plan is available at the next session or startup. In some embodiments, the floor plan is further processed to identify rooms and other segments. In some embodiments, a new floor plan is constructed at each use, or an extant floor plan is updated based on newly acquired data.

Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects upon detecting a difference of greater than a threshold size.

In some embodiments, the accuracy of the floor plan is confirmed when the locations at which contact between the robotic device and perimeter coincides with the locations of corresponding perimeters in the floor plan. When the robotic device makes contact with a perimeter it checks the floor plan to ensure that a perimeter is marked at the location at which the contact with the perimeter occurred. Where a boundary is predicted by the map but not detected, corresponding data points on the map may be assigned a lower confidence in the Bayesian approach above, and the area may be re-mapped with the approach above in response. This method may also be used to establish ground truth of Euclidean norms. In some embodiments, a separate map may be used to keep track of the boundary discovered thereby creating another map. Two maps may be merged using different methods, such as the intersection or union of two maps. For example, in some embodiments, the union of two maps may be applied to create an extended map of the working environment with areas which may have been undiscovered in the first map and/or the second map. In some embodiments, a second map may be created on top of a previously created map in a layered fashion, resulting in additional areas of the work space which may have not been recognized in the original map. Such methods may be used, for example, in cases where areas are separated by movable obstacles that may have prevented the robot from determining the full map of the working environment and in some cases, completing an assigned task. For example, a soft curtain may act as a movable object that appears as a wall in a first map. In this case, a second map may be created on top of the previously created first map in a layered fashion to add areas to the original map which may have not been previously discovered. The robot may then recognize (e.g., determine) the area behind the curtain that may be important (e.g., warrant adjusting a route based on) in completing an assigned task.

In one embodiment, construction of the floor plan is complete after the robotic device has made contact with all perimeters and confirmed that the locations at which contact with each perimeter was made coincides with the locations of corresponding perimeters in the floor plan. In some embodiments, a conservative coverage algorithm is executed to cover the internal areas of the floor plan before the robotic device checks if the observed perimeters in the floor plan coincide with the true perimeters of the environment. This ensures more area is covered before the robotic device faces challenging areas such as perimeter points and obstacles.

The position of laser lines in an image, indicated by pixels with intensity value above a threshold intensity, may be used to infer depth of surfaces of objects from the infrared illuminator and image sensor. The same laser lines in a captured image may also be used by the control system to detect a particular object with a specific indentation pattern. The control system may detect the object upon finding features in a captured image that match with features in a captured image of the object stored in a memory of the robot. Upon detecting the particular object, the control system may mark a location of the object in the floor plan and cause the robot to execute a specific action such as a specific movement or a specific operation/instruction (e.g., perform a deep cleaning in an area adjacent the object or remain in an area adjacent the object or execute a task in a first area then execute a task in a second area). Another example of a specific action the robot may execute upon detecting the particular object includes erecting a virtual boundary adjacent to the object and avoiding crossing the virtual boundary or remaining on one side of the virtual boundary.

In embodiments, once an aggregate map is generated, a robotic device may be controlled or directed to navigate or operate in locations in a work area based on data collected for the aggregate map. In embodiments, various navigation patterns and operational functions based on the aggregate map generated may be envisioned. In embodiments, a robotic device may be controlled to navigate and operate based on historical data, such as, for example, by prioritizing operation in areas where a low likelihood of operational hazards may be present over areas in which a high likelihood of operational hazards may be present. In embodiments, a robotic device may be controlled or directed to navigate or operate based on historical data regarding the presence or absence of obstacles in a work area. In embodiments, a robotic device may be controlled or directed to navigate or operate in areas based on preferences set in prior working sessions. In embodiments, a robotic device may be controlled or directed to navigate or operate in areas based on work surface type, such as, for example, a robotic device being controlled to operate at a higher rate of navigation speed on hard work surface types such as tile. In embodiments, a robotic device may be controlled or directed to navigate or operate in work areas with a historically lower set of operational hazard values over other work areas with a historically higher set of operational hazard values. In embodiments, a robotic device may be controlled or directed to navigate or operate in a portion of a work area rather than to operate in an entire work area. For example, a robotic device may be controlled to operate on first section of a hallway over a second section of a hallway. In embodiments, a robotic device may be controlled or directed to navigate or prioritize a working session in a first work area before navigating or operating in a second work area. In some embodiments, preferences may be set with regards to a working session such that scheduling, operational functions to be performed in the working session, and the like are preset rather than the robotic device utilizing data from prior work cycles to predict and enact a navigation and operations plan. In some embodiments, machine learning may be utilized by the robotic device, such that data from prior work sessions is utilized to predict and enact in a working session based on data collected from prior work cycles. For example, a robotic device may utilize data pertaining to, but not limited to, operational hazards encountered, type of operational hazard encountered, locations operated in, how successful a navigational route was, obstacles encountered, types of obstacles encountered, types of work surface operated on, scheduling information, preferences utilized in prior working sessions, whether multiple robotic devices were utilized, battery efficiency, and the like information.

In some embodiments, scheduling information for a work session may be provided to one or more processors of the robotic device. In some embodiments, scheduling information may be sent to a robotic device using a mobile communication device with a graphical user interface, remote control, a screen with graphical user interface on the robotic device, or another type of device that may communicate with the one or more processors of the robotic device. For example, a graphical user interface such as that described in U.S. patent application Ser. Nos. 15/272,752, 62/631,050, and 62/661,802, hereby incorporated by reference in their entirety, may be used for entering scheduling information. In some embodiments, a method for providing scheduling information to a robotic device such as that described in U.S. patent application Ser. No. 16/051,328, hereby incorporated by reference in its entirety, may be used. Embodiments described herein provide methods and systems to send scheduling information to a robot regardless of the status of the robot and the position of the dock, the robot, or communication device. In some embodiments, scheduling information may comprise time of operation, area of operation, frequency of operation, type of operation, duration of operation and/or any other information relating to the operation and/or function of the robotic device. In some embodiments, a dock (or charging station) in particular may include a housing, charging contacts, which are arranged on the surface of the housing such that the charging contacts of the mobile robot make contact with the charging contacts of the dock when the mobile robot drives up to and against the recharging station, and a power supply, which is electrically coupled to the charging contacts and supplies power thereto. In some embodiments, a user may send scheduling information remotely using a communication device via Wi-Fi and is not required to be within the vicinity of the robotic device or dock. Communication devices such as an electronic mobile device, smart phone, computer, tablet, or any device that has a Wi-Fi module, may be used to send scheduling information at any time. In some embodiments, the scheduling information is sent to a cloud service via Wi-Fi, to which the dock is connected. The dock is able to retrieve the information from the cloud service. The cloud service may include multiple cloud services or a network of cloud services. Since the dock is available to receive information, information may be sent generally at any time and does not require the robot to be available. In some embodiments, once the robot is ready to accept the information, the dock may transmit the information to the robot via RF. In some embodiments, the dock may transmit the information to the robot via Wi-Fi or by any other type of wireless connection, such as Bluetooth. In some embodiments, the robot may be able to retrieve the information from the cloud service.

In some embodiments, the charging station and a software application of the communication device are wirelessly paired such that the charging station and the application of the communication device may transmit or receive information, such as scheduling or robot information, to or from the cloud service. In some embodiments, the application comprises a mobile application designed to run on a mobile, stationary, and/or smart communication device and may be downloaded onto the communication device through various means. In some embodiments, the application comprises a web application that may be accessible through a stationary, mobile, and/or smart communication device through a web browser. In other embodiments, a software may be provided with the robotic device and charging station that may be downloaded onto the communication device. In embodiments, the pairing process may comprise connecting the communication device to a Wi-Fi network that is also accessible to the charging station of the robotic device, and logging into the application of the communication device using unique or standardized login information. In embodiments, the application of the communication device has connectivity with the cloud service. In some embodiments, the application of the communication device may generate a QR barcode comprising the Wi-Fi network's access point's SSID, Wi-Fi network's password (if applicable), and the at least one cloud service login information. In some embodiments, the QR barcode may be provided as a sticker with the robotic device and may comprise the at least one cloud service login information corresponding to the robotic device. In some embodiments, the robotic device may scan the QR barcode to retrieve the Wi-Fi network's access point's SSID, Wi-Fi network's password (if applicable), and the at least one cloud service login information and share the retrieved information with the charging station using an RF communication channel. In some embodiments, the robotic device may receive Wi-Fi network details and/or cloud service login information corresponding to the robotic device through other means, such as user input of network details and/or cloud service login information using a user interface of the robotic device. In some embodiments, the charging station may use the shared Wi-Fi access point's SSID, the Wi-Fi password, and the at least one cloud service login information to connect to the Wi-Fi network and the at least one cloud service and, once connected, the charging station may relay any information related to the robotic device to the at least one cloud service. In some embodiments, the charging station may be connected to the Wi-Fi network through other means, such as user input of network details using a user interface of the charging station. In some embodiments, the communication device application, also having connectivity to the at least one cloud service, may retrieve any information related to the robotic device from the cloud service. In the same way, the charging station may retrieve any information relayed to the at least one cloud service from the communication device application and share it with the robotic device via RF. In some embodiments, the charging station and robotic device may transfer information using other types of wireless communication channels, such as Wi-Fi. Other means of connecting the various components of the system are also possible, such as the use of Bluetooth.

In some embodiments, the docking station may be replaced by any other stationary device capable of transmitting and receiving information to and from the cloud service, and capable of transmitting and receiving information to and from the charging device. In some embodiments, the robotic device may dock or charge at a separate device than the stationary device used for the transfer of information to and from the cloud service and the transfer of information to and from the robotic device. For example, a stationary device having memory, processor, Wi-Fi module and RF module may perform the same functions as those of the charging station. In some embodiments, the robotic device may connect directly to the cloud service and bypass the charging station.

In some embodiments, the communication methods described between the robotic device, charging station, and the application of the communication device may be used for transmitting and receiving several different types of information, such as scheduling information, mapping information, navigation information, cleaning information, operation information or any other type of information that may be useful to the operator of the communication device, the robotic device, and/or the charging station. In some embodiments, these different types of information may be chosen or adjusted using a graphical user interface provided through a software application on a communication device such as a computer, tablet, smartphone, or a dedicated remote control before transmitting the information to the robotic device. The software application may be, but does not have to be, the same or related to the software application used in generating the QR barcode and connecting to the cloud service. For example, scheduling commands such as time of operation, area(s) of operation, the order in which areas are to be operated on, frequency of operation, type of operation corresponding to each area to be operated on, and duration of operation (to name a few) may be set or adjusted using a graphical user interface on a communication device before being transmitted to the robotic device using a communication method.

In some embodiments, the scheduling information may be a suggested work schedule based on previously received operational instructions and time of executing the instructions by the robotic device. Some embodiments provide a schedule development method for a robotic floor-cleaning device that automatically devises a work schedule based on historical data. Some embodiments record user inputs indicating days and times to start work. Some embodiments develop a work schedule for future work based on the recorded inputs. Some embodiments include an input/output means connected to a control unit of the robotic device. In some embodiments, the control unit is configured to save a date and time set by a user when the robotic device should be turned on. In some embodiments, the control unit is further configured to suggest a work schedule based on the saved data to the user using the input/output means.

Some embodiments disclose a method for setting a work schedule for a robotic device including: monitoring use times of a robotic device over a preset period of time; storing the times and dates the robotic device was turned on in a database; developing a suggested work schedule based on the stored data; and proposing the suggested work schedule to users through an input/output device. Some embodiments provide a method including: monitoring use times of a robotic device over a preset period of time; storing the times and dates the robotic device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules. One skilled in the art will appreciate that different embodiments of the invention may use different machine learning techniques such as, but not limited to, supervised learning, unsupervised learning, reinforcement learning, semi-supervised learning, etc.

In some embodiments, the input/output device may be wireless and may send and receive signals to and from remote devices, such as, for example, remote controls and smartphones. In some embodiments, the robotic device may be scheduled directly via a user interface positioned thereon. In some embodiments, inputs from a user and outputs from the robotic device may be provided through a software application installed on an internet-connected device, such as a smartphone, a computer, or a tablet.

An example of a process for devising a suggested work schedule, according to some embodiments, includes monitoring activation dates and times, storing the dates and times in a database, developing a suggested work schedule based on the stored data, and proposing the suggested work schedule. In some embodiments, the suggested work schedule is developed based on times the robotic device was turned on as per user-provided instruction. In some embodiments, the times the robotic device was turned on is stored in a database. In some embodiments, the suggested work schedule is followed by the robotic device after approval by the user of the suggested work schedule. In some embodiments, the suggested work schedule is developed based on data stored in the most recently updated database, wherein the database is continuously updated with new times the robotic device was turned on. In some embodiments, the suggested work schedule is developed based on the times the robotic device was turned on that are stored in the database and using a start time that is the mean or median of the start times in the database, a start time that is the mean or median of a subset of the start times in the database, and/or using a machine learning algorithm to devise a work schedule based on the times in the database.

In some embodiments, auditory instructions may be provided to the robotic device by, for example, an individual, specialized computer, robotic device, or control system. For example, an individual may audibly command the robotic device to reverse the direction of a mechanism which has become obstructed, or to provide more power to a mechanism which has become obstructed, or the like. In some embodiments, the robotic device may comprise a microphone module to receive voice commands. In embodiments, an individual may command the robotic device to conduct operations, setting a schedule for the time and location of the work operations. In embodiments, a robotic device may be given an audible command in order to overcome an issue of which the robotic has encountered during operations. In some embodiments, a graphical user interface of a communications device, or a screen with graphical user interface of a robotic device may display information regarding operations such as what work operations are being conducted, what work operations are scheduled and the like. In some embodiments, a graphical user interface of a communications device or a screen with graphical user interface of a robotic device may display information regarding an obstruction encountered including what mechanism is experiencing an obstruction, what has caused the issue, when and where the issue took place, what response a robotic device may make to overcome the issue, list a set of options for an individual to select from for the robotic device to attempt to overcome the issue, and the like. In some embodiments, an individual may be able to interact with a graphical user interface of a communications device or a screen with graphical user interface of a robotic device for making selections of actions a robotic device is to make such as, for example, what, where, when and the like a robotic device is to conduct work operations, how a robotic device is to respond to an obstruction the robotic device has encountered, and the like. In some embodiments, when the robotic device is unable to overcome an obstruction encountered by the robotic device, an individual may need to manually assist the robotic device in overcoming the obstruction. In embodiments, when an obstruction is encountered, the robotic device may alert the individual to the location, and type of obstruction encountered via an auditory message, via a screen with graphical user interface of the robotic device, via an application with graphical user interface of a communications device such as laptop, phone, tablet or the like, by lighting a set of lights, or the like.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

The present techniques will be better understood with reference to the following enumerated embodiments:
1. A method for a robotic device to overcome obstructions hindering the operations of the robotic device, the method comprising: providing a robotic device, the robotic device comprising: one or more processors, a chassis including a set of wheels, a motor for driving the set of wheels, a rechargeable battery for providing power to the robotic device, a control system module for controlling the movement of the robotic device, a set of sensors, a screen with graphical user interface, and a motor for providing increased power to modules of the robotic device when the modules become obstructed; The robotic device encountering an obstruction; and the robotic device autonomously enacting one or more predetermined responses to attempt to overcome the obstruction.
2. The method of embodiment 1, wherein: when a wheel of the robotic device becomes obstructed, additional power is provided to the wheel by a motor of the robotic device to overcome the obstruction by spinning at a higher rotation speed.
3. The method of embodiment 1, wherein: when a wheel of the robotic device becomes obstructed, the wheel is reversed for overcoming the obstruction and the robotic device thereby navigates in a reverse direction for overcoming the obstruction.
4. The method of embodiment 1, wherein: the wheels of the robotic device are omnidirectional wheels, and as such when they become obstructed, the wheels turn to navigate the robotic device in a direction such that the wheels become unobstructed.
5. The method of embodiment 1, wherein: when a side brush of the robotic device becomes obstructed, the side brush reverses the direction it is spinning in for overcoming the obstruction.
6. The method of embodiment 1, wherein: when a side brush of the robotic device becomes obstructed, additional power is provided to the side brush by a motor of the robotic device to overcome the obstruction by spinning at a higher rotational speed.
7. The method of embodiment 1, wherein: when a side brush of the robotic device becomes obstructed, the robotic device navigates in a predetermined direction in order to overcome the obstruction.
8. The method of embodiment 1, wherein: when a wheel of the robotic device becomes obstructed, additional power is provided to the wheel by a motor of the robotic device to overcome the obstruction by spinning at a higher rotational speed.
9. The method of embodiment 1, wherein: when a main brush of the robotic device becomes obstructed, additional power is provided to the main brush by a motor of the robotic device to overcome the obstruction by spinning at a higher rotational speed.
10. The method of embodiment 1, wherein: when a main brush of the robotic device becomes obstructed, the main brush reverses the direction it is spinning in for overcoming the obstruction.
11. The method of embodiment 1, wherein: when a main brush of the robotic device becomes obstructed, the robotic device navigates in a predetermined direction in order to overcome the obstruction.
12. The method of embodiment 1, wherein: a comb with a serrated edge is provided on the main brush of the robotic device, a motor providing power to the comb with serrated edge such that the comb with serrated edge navigates along the surface of the main brush by sliding over it.
13. The method of embodiment 13, wherein: when the main brush becomes entangled with an obstruction along the bristles of the main brush, the comb with serrated edge navigates along the surface of the main brush such that the serrated edges of the comb slice through and free away the obstruction.
14. The method of embodiment 1, wherein: when a vacuuming module of the robotic device becomes obstructed, a motor provides additional power to the module such that a higher rate of suction is achieved in order to overcome the obstruction.
15. The method of embodiment 1, wherein: when a vacuuming module of the robotic device becomes obstructed, the module reverses the airflow such that the module is blowing air in order to overcome the obstruction.
16. The method of embodiment 1, wherein: when a robotic device encounters an obstruction of which the robotic device is unable to overcome, the robotic device makes an alert by any of: generating a sound, generating an audio message, via a message of a screen with graphical user interface of the robotic device, via an application with graphical user interface of a communications device, or by display of a light.

17. A system comprising any one of embodiments 1-16.

The invention claimed is:

1. A method for operating a robotic device, comprising:
capturing, with a camera disposed on the robotic device, a plurality of images of an environment of the robotic device, the plurality of images comprising obstructions encountered by the robotic device during a work session;
identifying, with a processor of the robotic device, an obstruction type of an obstruction captured in at least one image of the plurality of images based on a comparison between features of the obstruction and features of different possible obstruction types stored in a database; and
actuating, with the processor of the robotic device, the robotic device to clean according to a suggested schedule, wherein the processor only actuates the robotic device to clean according to the suggested schedule after user approval of the suggested schedule:
wherein:
the possible obstruction types comprise at least feces and cords;
the robotic device alters its navigation path to avoid the obstruction when the obstruction type is feces;
an application of a communication device paired with the robotic device is configured to:
notify a user of a location of the obstruction and the obstruction type when the obstruction type is either of feces and cords;
propose the suggested schedule for operating the robotic device comprising at least one day and time to a user; and
receive at least one input designating: a schedule of the robotic device and an approval of the suggested schedule; and
functions of the robotic device are altered based on the presence and the absence of the user.

2. The method of claim 1, wherein data relating to the obstruction is recorded to improve future encounters with obstructions having a same obstruction type.

3. The method of claim 1, wherein:
the possible obstruction types further comprises debris;
the obstruction type is debris;
functions of the robotic device are altered based on the presence of the debris; and
a map of the environment comprises at least one location in which the debris was encountered.

4. The method of claim 1, wherein:
the possible obstruction types further comprises humans;
the obstruction type is a human; and
the robotic device executes a work session during times in which the human is unlikely to be encountered.

5. The method of claim 1, wherein different robotic device responses are executed for different obstruction types.

6. The method of claim 1, wherein:
the robotic device alerts the user using a set of lights disposed on the robotic device; and
the application provides alerts to the user.

7. The method of claim 1, further comprising:
determining, with the processor of the robotic device, an overlapping area of a field of view of a first image and a field of view of a second image by at least comparing image data of the first image and image data of the second image; and
spatially aligning, with the processor of the robotic device, the image data of the first image and the image data of the second image based on at least the overlapping area to construct a map of the environment, wherein the map comprises at least one of: object data, work surface type data, and debris data.

8. The method of claim 1, further comprising:
determining, with the processor, a likelihood of encountering an obstruction in a location within the environment based on at least previous encounters of the obstruction in the location, wherein the likelihood of encountering the obstruction comprises one of a plurality of possible likelihood levels comprising at least all whole numbers within a range of 0% likelihood to 100% likelihood; and
determining, with the processor, an action of the robotic device based on the likelihood of encountering the obstruction in the location.

9. A robotic device, comprising:
a processor;
a chassis;
a set of wheels;
a rechargeable battery;
a plurality of sensors;
a media storing instructions that when executed by the processor effectuates operations comprising:
capturing, with a camera disposed on the robotic device, a plurality of images of an environment of the robotic device, the plurality of images comprising obstructions encountered by the robotic device during a work session;
identifying, with a processor of the robotic device, an obstruction type of an obstruction captured in at least one image of the plurality of images based on a comparison between features of the obstruction and features of different possible obstruction types stored in a database; and
actuating, with the processor of the robotic device, the robotic device to clean according to a suggested schedule, wherein the processor only actuates the robotic device to clean according to the suggested schedule after user approval of the suggested schedule;
wherein:
the possible obstruction types comprise at least feces and cords;
the robotic device alters its navigation path to avoid the obstruction when the obstruction type is feces;
an application of a communication device paired with the robotic device is configured to:
notify a user of a location of the obstruction and the obstruction type when the obstruction type is either of feces and cords;
propose the suggested schedule for operating the robotic device comprising at least one day and time to a user; and
receive at least one input designating: a schedule of the robotic device and an approval of the suggested schedule; and
functions of the robotic device are altered based on the presence and the absence of the user.

10. The robotic device of claim 9, wherein data relating to the obstruction is recorded to improve future encounters with obstructions having a same obstruction type.

11. The robotic device of claim 9, wherein:
the possible obstruction types further comprises debris;
the obstruction type is debris;

functions of the robotic device are altered based on the presence of the debris; and a map of the environment comprises at least one location in which the debris was encountered.

12. The robotic device of claim 9, wherein different robotic device responses are executed for different obstruction types.

13. A medium storing instructions that when executed by a processor of a robotic device effectuates operations comprising:

capturing, with a camera disposed on the robotic device, a plurality of images of an environment of the robotic device, the plurality of images comprising obstructions encountered by the robotic device during a work session;

identifying, with the processor of the robotic device, an obstruction type of an obstruction captured in at least one image of the plurality of images based on a comparison between features of the obstruction and features of different possible obstruction types stored in a database; and actuating, with the processor of the robotic device, the robotic device to clean according to a suggested schedule, wherein the processor only actuates the robotic device to clean according to the suggested schedule after user approval of the suggested schedule;

wherein:

the possible obstruction types comprise at least feces and cords;

the robotic device alters its navigation path to avoid the obstruction when the obstruction type is feces;

an application of a communication device paired with the robotic device is configured to;

notify a user of a location of the obstruction and the obstruction type when the obstruction type is either of feces and cords;

propose the suggested schedule for operating the robotic device comprising at least one day and time to a user; and receive at least one input designating; a schedule of the robotic device and an approval of the suggested schedule; and functions of the robotic device are altered based on the presence and the absence of the user.

14. The method of claim 1, wherein the suggested schedule is determined using a machine learning algorithm.

15. The method of claim 1, wherein the suggested schedule is determined based on at least a plurality of user inputs historically provided to the application.

16. The method of claim 5, wherein the plurality of user inputs designates at least a plurality of schedules previously executed by the robotic device at a particular past day and time specified in each of the plurality of schedules.

17. The method of claim 1, wherein the suggested schedule is determined based on previous user cleaning habits using the robotic device.

18. The method of claim 5, wherein:

a robotic device response to a first particular obstruction type comprises erecting a virtual boundary adjacent to the obstruction within a map of the environment and the robotic device avoiding crossing the virtual boundary.

19. The method of claim 7, further comprising:

verifying, with a sensor of the robotic device, a location of at least one perimeter in the map by making contact with the at least one perimeter in the environment.

20. The method of claim 19, wherein the processor of the robotic device is configured to complete construction of the map after the robotic device has made contact with all perimeters in the environment and confirmed that the locations at which contact with each perimeter was made coincides with the locations of corresponding perimeters in the map.

* * * * *